(12) United States Patent
Kaneko et al.

(10) Patent No.: US 9,847,180 B2
(45) Date of Patent: Dec. 19, 2017

(54) NONAQUEOUS ELECTROLYTE SOLUTION, AND LITHIUM ION SECONDARY BATTERY HAVING THE SAME

(71) Applicant: NEC ENERGY DEVICES, LTD., Sagamihara-shi, Kanagawa (JP)

(72) Inventors: Shinako Kaneko, Sagamihara (JP); Hitoshi Ishikawa, Sagamihara (JP); Yoko Hashizume, Sagamihara (JP); Eiji Suzuki, Sagamihara (JP)

(73) Assignee: NEC ENERGY DEVICES, LTD., Sagamihara-shi (JP)

( * ) Notice: Subject to any disclaimer, the term of this patent is extended or adjusted under 35 U.S.C. 154(b) by 53 days.

(21) Appl. No.: 14/978,503

(22) Filed: Dec. 22, 2015

(65) Prior Publication Data

US 2016/0111220 A1    Apr. 21, 2016

Related U.S. Application Data

(63) Continuation of application No. 13/578,209, filed as application No. PCT/JP2011/052934 on Feb. 10, 2011.

(30) Foreign Application Priority Data

Feb. 10, 2010 (JP) ................... 2010-027056

(51) Int. Cl.
*H01M 10/056* (2010.01)
*H01G 9/035* (2006.01)
(Continued)

(52) U.S. Cl.
CPC ............ *H01G 9/035* (2013.01); *H01G 9/038* (2013.01); *H01G 9/145* (2013.01); *H01G 11/60* (2013.01);
(Continued)

(58) Field of Classification Search
CPC .................................................. H01M 10/056
See application file for complete search history.

(56) References Cited

U.S. PATENT DOCUMENTS

| | | |
|---|---|---|
| 2005/0158623 A1 | 7/2005 | Matsui et al. |
| 2006/0172201 A1 | 8/2006 | Yasukawa et al. |
| | (Continued) | |

FOREIGN PATENT DOCUMENTS

| | | |
|---|---|---|
| CN | 1337398 A | 2/2002 |
| CN | 1555589 A | 12/2004 |
| | (Continued) | |

OTHER PUBLICATIONS

Communication dated Apr. 2, 2014, issued by the State Intellectual Property Office of the People's Republic of China in Application No. 201180009062.3.
(Continued)

*Primary Examiner* — Alex Usyatinsky
(74) *Attorney, Agent, or Firm* — Sughrue Mion, PLLC

(57) ABSTRACT

The exemplary embodiment has an object to provide a nonaqueous electrolyte solution having a flame retardancy over a long period and having a good capacity maintenance rate. The exemplary embodiment is a nonaqueous electrolyte solution containing a lithium salt, at least one oxo-acid ester derivative of phosphorus selected from compounds represented by a predetermined formula, and at least one disulfonate ester selected from a cyclic disulfonate ester and a linear disulfonate ester represented by the predetermined formulae.

5 Claims, 3 Drawing Sheets

(51) Int. Cl.
  *H01G 9/022* (2006.01)
  *H01G 11/60* (2013.01)
  *H01M 10/052* (2010.01)
  *H01M 10/0567* (2010.01)
  *H01M 10/0568* (2010.01)
  *H01M 10/0569* (2010.01)
  *H01M 10/42* (2006.01)
  *H01G 9/145* (2006.01)
  *H01M 10/0525* (2010.01)
  *H01M 10/0565* (2010.01)

(52) U.S. Cl.
  CPC ..... *H01M 10/052* (2013.01); *H01M 10/0525* (2013.01); *H01M 10/0567* (2013.01); *H01M 10/0568* (2013.01); *H01M 10/0569* (2013.01); *H01M 10/4235* (2013.01); *H01M 10/0565* (2013.01); *H01M 2300/0025* (2013.01); *Y02E 60/122* (2013.01); *Y02E 60/13* (2013.01)

(56) References Cited

U.S. PATENT DOCUMENTS

| | | | |
|---|---|---|---|
| 2006/0204854 A1 | 9/2006 | Fujimoto et al. | |
| 2006/0292452 A1* | 12/2006 | Utsugi | C07C 309/07 429/340 |
| 2008/0138715 A1 | 6/2008 | Ihara et al. | |
| 2009/0325065 A1* | 12/2009 | Fujii | H01M 4/04 429/199 |

FOREIGN PATENT DOCUMENTS

| | | |
|---|---|---|
| CN | 1641922 A | 7/2005 |
| CN | 101057355 A | 10/2007 |
| CN | 101432923 A | 5/2009 |
| CN | 101542819 A | 9/2009 |
| JP | 2908719 B2 | 6/1999 |
| JP | 2002-198095 A | 7/2002 |
| JP | 3422769 B2 | 6/2003 |
| JP | 2005-229103 A | 8/2005 |
| JP | 3821495 B2 | 9/2006 |
| JP | 2006-286277 A | 10/2006 |
| JP | 2007-059192 A | 3/2007 |
| JP | 2007-87796 A | 4/2007 |
| JP | 3961597 B2 | 8/2007 |
| JP | 2007-258067 A | 10/2007 |
| JP | 2008-071559 A | 3/2008 |
| JP | 2008-112722 A | 5/2008 |
| JP | 2009-129747 A | 6/2009 |

OTHER PUBLICATIONS

International Search Report of PCT/JP2011/052934 dated May 24, 2011.

Office Action issued by the Japanese Patent Office dated Oct. 1, 2013 in Application No. 2011-553900.

* cited by examiner (a)

(b)

NONAQUEOUS ELECTROLYTE SOLUTION, AND LITHIUM ION SECONDARY BATTERY HAVING THE SAME

CROSS-REFERENCE TO RELATED APPLICATIONS

This is a Continuation of U.S. application Ser. No. 13/578,209, filed Aug. 9, 2012, which is the National Stage Entry of International Application No. PCT/JP2011/052934, filed Feb. 10, 2011, which claims benefit of Japanese Patent Application No. 2010-027056, filed Feb. 10, 2010, the contents of all of which are incorporated herein by reference in their entirety.

TECHNICAL FIELD

The present invention relates to a nonaqueous electrolyte solution, and a lithium ion secondary battery having the same.

BACKGROUND ART

Since lithium ion secondary batteries, which are devices having a nonaqueous electrolyte solution, can achieve high energy densities, they attract attention as batteries for cell phones, batteries for notebook computers, batteries for large power storage, and batteries for automobiles.

Although lithium ion secondary batteries can achieve high energy densities, up-sizing makes the energy gigantic, and higher safety is demanded. For example, in large power sources for power storage and power sources for automobiles, especially high safety is demanded. Therefore, safety measures are applied such as the structural design of cells, packages and the like, protection circuits, electrode materials, additives having an overcharge protection function, the reinforcement of shutdown function of separators, and the like.

Lithium ion secondary batteries use aprotic solvents such as cyclic carbonates and linear carbonates as an electrolyte solvent; and these carbonates are likely to have a low flash point and be combustible though having a high dielectric constant and a high ionic conductivity of lithium ions.

A technology is known which uses as an additive a substance reductively decomposed at a higher potential than carbonates used as electrolyte solvents and forming an SEI (Solid Electrolyte Interface) being a protection membrane having a high lithium ion permeability. The SEI has large effects on the charge/discharge efficiency, the cycle characteristics and the safety. The SEI can further reduce the irreversible capacity of carbon materials and oxide materials.

One of means to further enhance the safety of lithium ion secondary batteries includes making electrolyte solutions flame retardancy. Patent Literature 1 discloses an organic electrolyte solution secondary battery using a phosphate triester as a main solvent of an organic electrolyte solution and having a negative electrode of a carbon material as a constituting element.

Patent Literature 2 discloses that the use of a mixed solvent of a specific halogen-substituted phosphate ester compound and a specific ester compound as an electrolyte solvent can provide an electrolyte solution having a low viscosity and excellent low-temperature characteristics. Patent Literature 3 discloses a method for manufacturing a nonaqueous electrolyte battery by using a nonaqueous electrolyte solution containing vinylene carbonate and 1,3-propane sultone added therein. Patent Literature 4 discloses a battery having a nonaqueous electrolyte solution which contains a predetermined amount of phosphate esters having fluorine atoms in molecular chains thereof, and salts in a concentration of 1 mol/L or higher, has a viscosity of lower than 6.4 mPa·s. The disclosure contends that making such a constitution can provide a battery having an excellent flame retardancy, a self-extinguishing property and high-rate charge/discharge characteristics.

Patent Literature 5 discloses a nonaqueous electrolyte solution containing at least one phosphate ester derivative represented by a predetermined formula, a nonaqueous solvent and a solute. Patent Literature 6 discloses that the use of a fluorophosphate ester compound as a nonaqueous electrolyte solution can provide an electrolyte solution being excellent in the conductivity and the reduction resistance, and developing a high flame retardancy even in a low blend amount.

Patent Literature 7 discloses a nonaqueous electrolyte solution obtained by dissolving a lithium salt in a nonaqueous solvent containing a phosphate ester compound, a cyclic carbonate ester containing a halogen, and a linear carbonate ester.

CITATION LIST

Patent Literature

Patent Literature 1: JP2908719B
Patent Literature 2: JP3821495B
Patent Literature 3: JP2007-059192A
Patent Literature 4: JP2007-258067A
Patent Literature 5: JP3422769B
Patent Literature 6: JP2006-286277A
Patent Literature 7: JP3961597B

SUMMARY OF INVENTION

Technical Problem

However, in Patent Literature 1, a phosphate ester is reductively decomposed on a carbon negative electrode during long-term usage, and a resistance rise due to the deposition of the reductant on the electrode, a resistance rise due to the generation of gases, and the like are caused, largely decreasing battery characteristics in some cases. Further a problem is posed in which the phosphate ester is reductively decomposed during usage, and the flame retardancy of the electrolyte solution decreases in some cases.

In Patent Literatures 2 to 6, although there are descriptions about the flame retardancy of electrolyte solutions and the initial characteristics of batteries, there is no reference to the long-term reliability of the batteries. There is further a problem in which a halogen-substituted phosphate ester and a derivative thereof as well are reductively decomposed gradually on a negative electrode during long-term usage, causing a decrease in battery characteristics due to a resistance rise in some cases, and as a result of the reductive decomposition, the flame retardancy of the electrolyte solutions decreases in some cases. Particularly, even in the case where vinylene carbonate or 1,3-propane sultone is added as an additive to form an SEI as shown in Patent Literature 3, a sufficient life cannot be obtained in some cases. There is no reference to the flame retardancy over a long period.

Patent Literature 7 describes that a halogen-substituted cyclic carbonate ester can form a film containing the halogen on a negative electrode, and the reductive decomposition of a phosphate ester or a halogen-substituted phosphate ester can be suppressed. However, in the case where the reductive decomposition of a phosphate ester or a halogen-substituted phosphate ester is intended to be suppressed over a long period only by a halogen-substituted cyclic carbonate ester, a large amount of the halogen-substituted cyclic carbonate ester becomes necessitated, and a decrease in the ionic conductivity of an electrolyte solution is caused in some cases. There are further cases where a large resistance rise and a decrease in the capacity maintenance rate of batteries in a long period are caused.

Thus, the exemplary embodiment has an object to provide a nonaqueous electrolyte solution having a flame retardancy over a long period and having a good capacity maintenance rate.

Solution to Problem

One exemplary embodiment is a nonaqueous electrolyte solution, comprising:

a lithium salt;

at least one oxo-acid ester derivative of phosphorus selected from compounds represented by the formulae (1) to (3); and at least one disulfonate ester selected from a cyclic disulfonate ester represented by the formula (4) and a linear disulfonate ester represented by the formula (5).

[Formula 1]

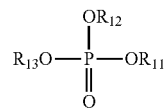

(1)

In the formula (1), $R_{11}$, $R_{12}$ and $R_{13}$ each independently represent any group selected from an alkyl group, an aryl group, an alkenyl group, a cyano group, a phenyl group, an amino group, a nitro group, an alkoxy group and a cycloalkyl group, and a halogen-substituted group thereof; and any two or all of $R_{11}$, $R_{12}$ and $R_{13}$ may be bonded to form a cyclic structure.

[Formula 2]

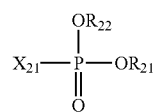

(2)

In the formula (2), $R_{21}$ and $R_{22}$ each independently represent any group selected from an alkyl group, an aryl group, an alkenyl group, a cyano group, a phenyl group, an amino group, a nitro group, an alkoxy group and a cycloalkyl group, and a halogen-substituted group thereof; and $R_{21}$ and $R_{22}$ may be bonded to form a cyclic structure; and $X_{21}$ represents a halogen atom.

[Formula 3]

(3)

In the formula (3), $R_{31}$ represents any group selected from an alkyl group, an aryl group, an alkenyl group, a cyano group, a phenyl group, an amino group, a nitro group, an alkoxy group and a cycloalkyl group, and a halogen-substituted group thereof; and $X_{31}$ and $X_{32}$ each independently represent a halogen atom.

[Formula 4]

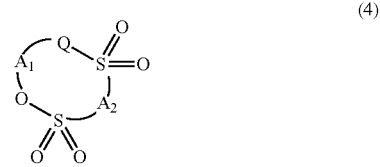

(4)

In the formula (4), Q represents an oxygen atom, a methylene group or a single bond; $A_1$ represents a substituted or unsubstituted alkylene group having 1 to 5 carbon atoms which may be branched, a carbonyl group, a sulfinyl group, a substituted or unsubstituted perfluoroalkylene group having 1 to 5 carbon atoms which may be branched, a substituted or unsubstituted fluoroalkylene group having 2 to 6 carbon atoms which may be branched, a substituted or unsubstituted alkylene group having 1 to 6 carbon atoms which contains an ether bond and may be branched, a substituted or unsubstituted perfluoroalkylene group having 1 to 6 carbon atoms which contains an ether bond and may be branched, or a substituted or unsubstituted fluoroalkylene group having 2 to 6 carbon atoms which contains an ether bond and may be branched; and $A_2$ represents a substituted or unsubstituted alkylene group, a substituted or unsubstituted fluoroalkylene group, or an oxygen atom.

[Formula 5]

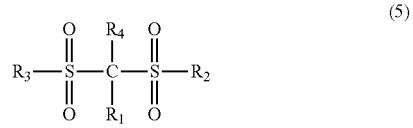

(5)

In the formula (5), $R_1$ and $R_4$ each independently represent an atom or a group selected from a hydrogen atom, a substituted or unsubstituted alkyl group having 1 to 5 carbon atoms, a substituted or unsubstituted alkoxy group having 1 to 5 carbon atoms, a substituted or unsubstituted fluoroalkyl group having 1 to 5 carbon atoms, a polyfluoroalkyl group having 1 to carbon atoms, —$SO_2X_{11}$ ($X_{11}$ is a substituted or unsubstituted alkyl group having 1 to 5 carbon atoms), —$SY_{11}$ ($Y_{11}$ is a substituted or unsubstituted alkyl group having 1 to 5 carbon atoms), —COZ (Z is a hydrogen atom or a substituted or unsubstituted alkyl group having 1 to 5 carbon atoms), and a halogen atom; and $R_2$ and $R_3$ each independently represent an atom or a group selected from a substituted or unsubstituted alkyl group having 1 to 5 carbon atoms, a substituted or unsubstituted alkoxy group having 1 to 5 carbon atoms, a substituted or unsubstituted phenoxy group, a substituted or unsubstituted fluoroalkyl group having 1 to 5 carbon atoms, a polyfluoroalkyl group having 1 to 5 carbon atoms, a substituted or unsubstituted fluoroalkoxy group having 1 to 5 carbon atoms, a polyfluoroalkoxy group having 1 to 5 carbon atoms, a hydroxyl group, a halogen atom, —$NX_{12}X_{13}$ ($X_{12}$ and $X_{13}$ are each independently a hydrogen atom or a substituted or unsubstituted alkyl group having 1 to 5 carbon atoms), and —$NY_{12}CONY_{13}Y_{14}$ ($Y_{12}$ to $Y_{14}$ are each independently a hydrogen atom or a substituted or unsubstituted alkyl group having 1 to 5 carbon atoms).

One exemplary embodiment is the nonaqueous electrolyte solution containing 5% by mass or more and 60% by mass or less of the oxo-acid ester derivative of phosphorus.

One exemplary embodiment is the nonaqueous electrolyte solution containing 0.05% by mass or more and 10% by mass or less of the disulfonate ester.

One exemplary embodiment is further the nonaqueous electrolyte solution containing 0.5% by mass or more and 20% by mass or less of a cyclic carbonate ester containing a halogen.

One exemplary embodiment is the nonaqueous electrolyte solution gelated with a polymer component or a polymer.

One exemplary embodiment is a lithium ion secondary battery having the nonaqueous electrolyte solution.

One exemplary embodiment is a capacitor having the nonaqueous electrolyte solution.

Advantageous Effects of Invention

The exemplary embodiment can provide a nonaqueous electrolyte solution having a flame retardancy over a long period and having a good capacity maintenance rate.

BRIEF DESCRIPTION OF DRAWINGS

FIG. 1(a) is a plan diagram of the positive electrode, and FIG. 1(b) is a side diagram of the positive electrode.

FIG. 2(a) is a plan diagram of the negative electrode, and FIG. 1(b) is a side diagram of the negative electrode.

DESCRIPTION OF EMBODIMENTS

Figure 1:
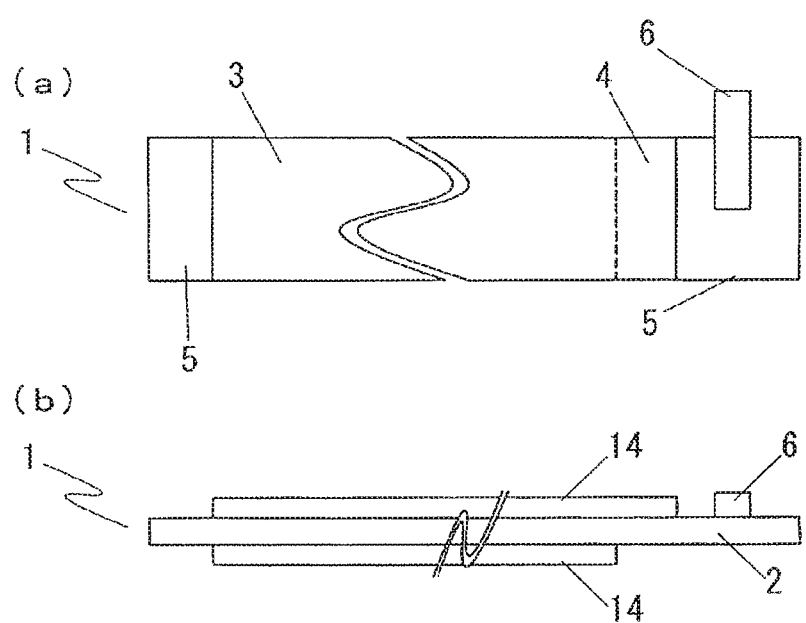
FIG. 1 is a schematic diagram illustrating a constitution of a positive electrode of a lithium ion secondary battery.

Hereinafter, the exemplary embodiment will be described in detail.

The nonaqueous electrolyte solution according to the exemplary embodiment comprises an aprotic solvent, a lithium salt, an oxo-acid ester derivative of phosphorus, and a disulfonate ester. The exemplary embodiment can provide a nonaqueous electrolyte solution concurrently having a high flame retardancy and a good capacity maintenance rate.

The oxo-acid ester derivative of phosphorus comprises at least one selected from compounds represented by the following formulae (1) to (3). The oxo-acid ester derivative of phosphorus contributes to the flame retardancy of an electrolyte solution.

[Formula 6]

(1)

In the formula (1), $R_{11}$, $R_{12}$ and $R_{13}$ each independently represent any group selected from an alkyl group, an aryl group, an alkenyl group, a cyano group, a phenyl group, an amino group, a nitro group, an alkoxy group and a cycloalkyl group, and a halogen-substituted group thereof; and any two or all of $R_{11}$, $R_{12}$ and $R_{13}$ may be bonded to form a cyclic structure.

[Formula 7]

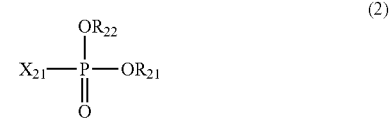

(2)

In the formula (2), $R_{21}$ and $R_{22}$ each independently represent any group selected from an alkyl group, an aryl group, an alkenyl group, a cyano group, a phenyl group, an amino group, a nitro group, an alkoxy group and a cycloalkyl group, and a halogen-substituted group thereof; $R_{21}$ and $R_{22}$ may be bonded to form a cyclic structure; and $X_{21}$ represents a halogen atom.

[Formula 8]

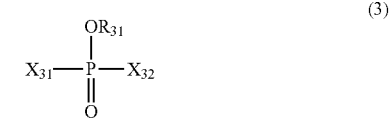

(3)

In the formula (3), $R_{31}$ represents any group selected from an alkyl group, an aryl group, an alkenyl group, a cyano group, a phenyl group, an amino group, a nitro group, an alkoxy group and a cycloalkyl group, and a halogen-substituted group thereof; and $X_{31}$ and $X_{32}$ each independently represent a halogen atom.

A nonaqueous electrolyte solution may contain one or more oxo-acid ester derivatives of phosphorus represented by the above formulae (1) to (3).

Specific examples of compounds represented by the formula (1) include, but are not especially limited to, phosphate esters such as trimethyl phosphate, triethyl phosphate, tributyl phosphate, triphenyl phosphate, dimethyl ethyl phosphate, dimethyl propyl phosphate, dimethyl butyl phosphate, diethyl methyl phosphate, dipropyl methyl phosphate, dibutyl methyl phosphate, methyl ethyl propyl phosphate, methyl ethyl butyl phosphate and methyl propyl butyl phosphate. The halogen-substituted phosphate ester includes tri(trifluoroethyl) phosphate, methyl (ditrifluoroethyl) phosphate, dimethyl (trifluoroethyl) phosphate, ethyl (ditrifluoroethyl) phosphate, diethyl (trifluoroethyl) phosphate, propyl (ditrifluoroethyl) phosphate, dipropyl (trifluoroethyl) phosphate, tri(pentafluoropropyl) phosphate, methyl (dipentafluoropropyl) phosphate, dimethyl (pentafluoropropyl)

phosphate, ethyl (dipentafluoropropyl) phosphate, diethyl (pentafluoropropyl) phosphate, butyl (dipentafluoropropyl) phosphate and dibutyl (pentafluoropropyl) phosphate.

Specific examples of compounds represented by the formula (2) are not especially limited to the following, but include dimethyl fluorophosphonate, diethyl fluorophosphonate, dibutyl fluorophosphonate, diphenyl fluorophosphonate, methyl ethyl fluorophosphonate, methyl propyl fluorophosphonate, methyl butyl fluorophosphonate, ethyl methyl fluorophosphonate, propyl methyl fluorophosphonate, butyl methyl fluorophosphonate, ethyl propyl fluorophosphonate, ethyl butyl fluorophosphonate, propyl butyl fluorophosphonate, di(trifluoroethyl) fluorophosphonate, methyl trifluoroethyl fluorophosphonate, ethyl trifluoroethyl fluorophosphonate, propyl trifluoroethyl fluorophosphonate, di(pentafluoropropyl) fluorophosphonate, methyl pentafluoropropyl fluorophosphonate, ethyl pentafluoropropyl fluorophosphonate, butyl pentafluoropropyl fluorophosphonate, difluorophenyl fluorophosphonate and ethyl fluorophenyl fluorophosphonate.

Specific examples of compounds represented by the formula (3) are not especially limited to the following, but include methyl difluorophosphinate, ethyl difluorophosphinate, butyl difluorophosphinate, phenyl difluorophosphinate, propyl difluorophosphinate, trifluoroethyl difluorophosphinate, fluoropropyl difluorophosphinate and fluorophenyl difluorophosphinate.

The content of an oxo-acid ester derivative of phosphorus in a nonaqueous electrolyte solution is preferably 5% by mass or higher and 60% by mass or lower. Making the content of the oxo-acid ester derivative of phosphorus to be 5 by mass or higher can improve the flame retardancy of the nonaqueous electrolyte solution. Making the content of the oxo-acid ester derivative of phosphorus to be 60% by mass or lower can suppress a rise in the viscosity of the electrolyte solution, and can hold the ionic conductivity at a reasonable one.

The disulfonate ester is at least one selected from a cyclic disulfonate ester represented by the formula (4) and a linear disulfonate ester represented by the formula (5).

[Formula 9]

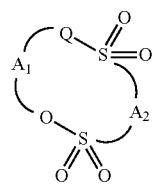

(4)

In the formula (4), Q represents an oxygen atom, a methylene group or a single bond; $A_1$ represents a substituted or unsubstituted alkylene group having 1 to 5 carbon atoms which may be branched, a carbonyl group, a sulfinyl group, a substituted or unsubstituted perfluoroalkylene group having 1 to 5 carbon atoms which may be branched, a substituted or unsubstituted fluoroalkylene group having 2 to 6 carbon atoms which may be branched, a substituted or unsubstituted alkylene group having 1 to 6 carbon atoms which contains an ether bond and may be branched, a substituted or unsubstituted perfluoroalkylene group having 1 to 6 carbon atoms which contains an ether bond and may be branched, or a substituted or unsubstituted fluoroalkylene group having 2 to 6 carbon atoms which contains an ether bond and may be branched; and $A_2$ represents a substituted or unsubstituted alkylene group, a substituted or unsubstituted fluoroalkylene group, or an oxygen atom.

[Formula 10]

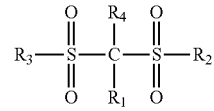

(5)

In the formula (5), $R_1$ and $R_4$ each independently represent an atom or a group selected from a hydrogen atom, a substituted or unsubstituted alkyl group having 1 to 5 carbon atoms, a substituted or unsubstituted alkoxy group having 1 to 5 carbon atoms, a substituted or unsubstituted fluoroalkyl group having 1 to 5 carbon atoms, a polyfluoroalkyl group having 1 to carbon atoms, —$SO_2X_{11}$ ($X_{11}$ is a substituted or unsubstituted alkyl group having 1 to 5 carbon atoms), —$SY_{11}$ ($Y_{11}$ is a substituted or unsubstituted alkyl group having 1 to 5 carbon atoms), —COZ (Z is a hydrogen atom or a substituted or unsubstituted alkyl group having 1 to 5 carbon atoms), and a halogen atom; and $R_2$ and $R_3$ each independently represent an atom or a group selected from a substituted or unsubstituted alkyl group having 1 to 5 carbon atoms, a substituted or unsubstituted alkoxy group having 1 to 5 carbon atoms, a substituted or unsubstituted phenoxy group, a substituted or unsubstituted fluoroalkyl group having 1 to 5 carbon atoms, a polyfluoroalkyl group having 1 to 5 carbon atoms, a substituted or unsubstituted fluoroalkoxy group having 1 to 5 carbon atoms, a polyfluoroalkoxy group having 1 to 5 carbon atoms, a hydroxyl group, a halogen atom, —$NX_{12}X_{13}$ ($X_{12}$ and $X_{13}$ are each independently a hydrogen atom or a substituted or unsubstituted alkyl group having 1 to 5 carbon atoms), and —$NY_{12}CONY_{13}Y_{14}$ ($Y_{12}$ to $Y_{14}$ are each independently a hydrogen atom or a substituted or unsubstituted alkyl group having 1 to 5 carbon atoms).

Specific examples of compounds represented by the formula (4) are shown in Table 1, and specific examples of compounds represented by the formula (5) are shown in Table 2, but the present invention is not limited thereto. These compounds may be used singly or concurrently in tow or more.

TABLE 1

| Compound No. | Chemical Structure |
|---|---|
| 1 |  |
| 2 |  |
| 3 |  |

TABLE 1-continued
| Compound No. | Chemical Structure |
|---|---|
| 4 | 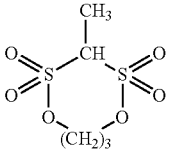 |
| 5 | 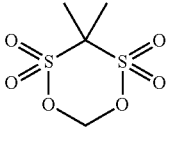 |
| 6 | 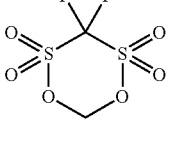 |
| 7 | 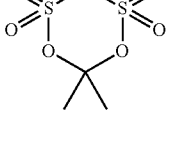 |
| 8 | 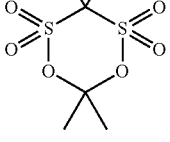 |
| 9 | 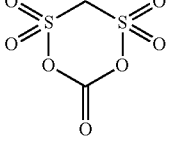 |
| 10 | 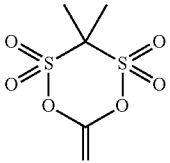 |
| 11 | 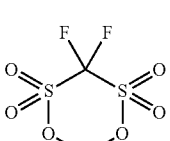 |
| 12 | 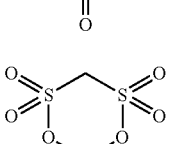 |
| 13 | 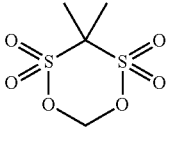 |
| 14 | 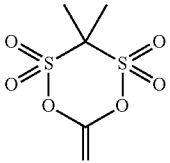 |
| 15 | 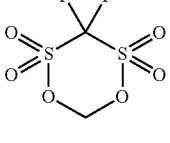 |
| 16 | 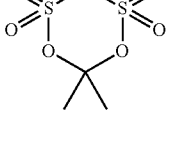 |
| 17 | 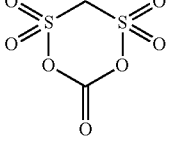 |
| 18 | 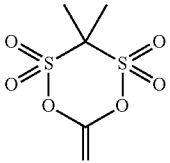 |
| 19 | 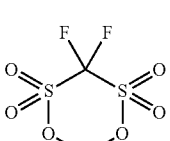 |
| 20 | 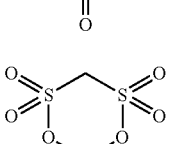 |
| 21 | 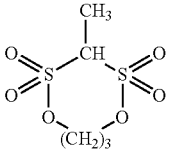 |

TABLE 1-continued

| Compound No. | Chemical Structure |
|---|---|
| 22 | cyclic structure: 1,3,2,4-dioxadithiolane 2,2,4,4-tetraoxide (O=S(=O)-CH2-S(=O)(=O)-O-CH2- ring) |

TABLE 2

| Compound No. | Chemical Structure |
|---|---|
| 101 | CH2(SO2OCH3)2 |
| 102 | CH2(SO2OCH2CH3)2 |
| 103 | CH2(SO2-CH(CH3)2)2 |
| 104 | CH3-CH(SO2OCH3)2 |
| 105 | (CH3)2C(SO2OCH3)2 |
| 106 | CH3-SO2-CH2-SO2-OCH2CH2CH3 |
| 107 | CH3-SO2-CH2-SO2-OCH2CH2Cl |
| 108 | H3CO-CH(SO2OCH3)2 |
| 109 | CF2(SO2OCH3)2 |
| 110 | HO-SO2-CH2-SO2-OCH3 |
| 111 | Cl-SO2-CH2-SO2-OCH2CH2OH |
| 112 | Cl-SO2-CH2-SO2-OCH2CH2OSO2CH2Cl |
| 113 | CH2(SO2OCF2CF3)2 |
| 114 | CH2(SO2NH2)2 |
| 115 | H2N-SO2-CH2-SO2-OC6H5 |

TABLE 2-continued

| Compound No. | Chemical Structure |
|---|---|
| 116 | 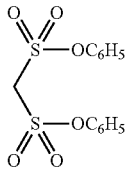 |
| 117 | 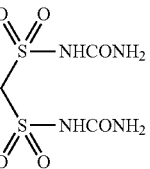 |
| 118 | 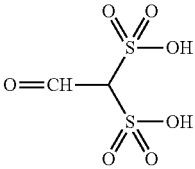 [SMILES: O=CC(S(=O)(=O)O)S(=O)(=O)O] |
| 119 | 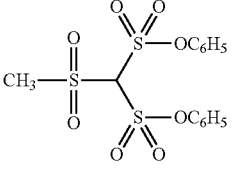 |
| 120 | 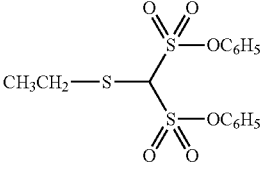 |

The compounds represented by the formula (4) or the formula (5) can be obtained, for example, by using a production method described in JP5-44946B.

The content of a disulfonate ester in a nonaqueous electrolyte solution is preferably 0.05% by mass or higher and 10% by mass or lower, and more preferably 0.1% by mass or higher and 5% by mass or lower. When the content of the disulfonate ester is 0.05% by mass or higher, the reductive decomposition of an oxo-acid ester derivative of phosphorus can be suppressed; and when the content is 10% by mass or lower, since an excessive increase in film thickness is prevented, a decrease in the capacity can be suppressed. When the content of the disulfonate ester is 0.1% by mass or higher, the reductive decomposition of the oxo-acid ester derivative of phosphorus can be more easily suppressed over a long period. When the content of the disulfonate ester is 5% by mass or lower, the film thickness can be made in a suitable range, an increase in the resistance can be prevented, and decreases in the capacity and the maintenance rate can be suppressed more.

The nonaqueous electrolyte solution according to the exemplary embodiment may contain an aprotic solvent. The aprotic solvent is not especially limited, but examples thereof include cyclic carbonates such as propylene carbonate (PC), ethylene carbonate (EC), butylene carbonate (BC) and vinylene carbonate (VC), linear carbonates such as dimethyl carbonate (DMC), diethyl carbonate (DEC), ethyl methyl carbonate (EMC) and dipropyl carbonate (DPC), aliphatic carboxylate esters such as methyl formate, methyl acetate and ethyl propionate, γ-lactones such as γ-butyrolactone, linear ethers such as 1,2-ethoxyethane (DEE) and ethoxymethoxyethane (EME), cyclic ethers such as tetrahydrofuran and 2-methyltetrahydrofuran, dimethyl sulfoxide, 1,3-dioxolane, formamide, acetamide, dimethylformamide, dioxolane, acetonitrile, propylnitrile, nitromethane, ethylmonoglyme, phosphate triesters, trimethoxymethane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, anisole, N-methylpyrrolidone, and fluorocarboxylate esters. These aprotic solvents may be used singly or as a mixture of two or more.

The nonaqueous electrolyte solution according to the exemplary embodiment may further contain a cyclic carbonate ester containing a halogen. Since the addition of a cyclic carbonate ester containing a halogen improves the ionic conductivity of the nonaqueous electrolyte solution and also contributes to the film formation, the maintenance of battery characteristics and the flame retardancy over a long period can be attained. An example of the cyclic carbonate ester containing a halogen includes a fluorine-containing carbonate. The fluorine-containing carbonate includes a linear one and a cyclic one, and a cyclic fluorine-containing carbonate (hereinafter, also abbreviated to a fluorine-containing cyclic carbonate) is preferable.

The fluorine-containing cyclic carbonate is not especially limited, but a compound in which a part of propylene carbonate, vinylene carbonate or vinyl ethylene carbonate is fluorinated, or the like may be used. More specific examples thereof include 4-fluoro-1,3-dioxolan-2-one (fluoroethylene carbonate, hereinafter, also referred to as FEC), (cis- or trans-) 4,5-difluoro-1,3-dioxolan-2-one (difluoroethylene carbonate), 4,4-difluoro-1,3-dioxolan-2-one, 4-fluoro-5-methyl-1,3-dioxolan-2-one, and a fluoropropylene carbonate. These may be used singly or as a mixture of two or more. Above all, the fluoroethylene carbonate is preferable.

The content of a cyclic carbonate ester containing a halogen in a nonaqueous electrolyte solution is preferably 0.5% by mass or higher and 20% by mass or lower, and more preferably 0.5% by mass or higher and 10% by mass or lower. When the content of the cyclic carbonate ester containing a halogen is 0.5% by mass or higher, the reductive decomposition of an oxo-acid ester derivative of phosphorus can be suppressed; and when the content is 20% by mass or lower, an increase in the resistance due to a film originated from the cyclic carbonate ester containing a halogen can be suppressed, and a decrease in the capacity can be suppress. When the content of the cyclic carbonate ester containing a halogen is 10% by mass or lower, the film thickness of the film can be made in a suitable range, further an increase in the resistance can be prevented, and decreases in the capacity and the maintenance rate can be suppressed more.

An electrolyte contained in the nonaqueous electrolyte solution according to the exemplary embodiment is not especially limited to the following, but examples thereof include $LiPF_6$, $LiBF_4$, $LiAsF_6$, $LiSbF_6$, $LiClO_4$, $LiAlCl_4$, $LiN(C_nF_{2n+1}SO_2)(C_mF_{2m+1}SO_2)$ (n and m are natural numbers), and $LiCF_3SO_3$.

In the lithium ion secondary battery having a nonaqueous electrolyte solution according to the exemplary embodiment, as a negative electrode active substance, one or two or more substances can be used which are selected from the group consisting of, for example, metallic lithium, lithium alloys and materials capable of adsorbing and releasing lithium. The material adsorbing and releasing lithium ions includes carbon materials and oxides.

The carbon materials may be graphite, amorphous carbon, diamond-like carbon, carbon nanotubes and the like to adsorb lithium, and composite materials thereof. Particularly graphite has a high electron conductivity, is excellent in the adhesivity with a current collector composed of a metal such as copper, and the voltage flatness, and contains only a low content of impurities because of being formed at a high processing temperature, which are preferably advantageous for improvement of the negative electrode performance. A composite material of a high-crystalline graphite and a low-crystalline amorphous carbon, and the like can also be used.

The oxide may be one of silicon oxide, tin oxide, indium oxide, zinc oxide, lithium oxide, phosphoric acid and boric acid, or may be a composite thereof, which preferably contains especially silicon oxide. The structure is preferably in an amorphous state. This is because silicon oxide is stable and causes no reaction with other compounds, and because the amorphous structure introduces no deteriorations caused by non-uniformity such as crystal grain boundaries and defects. Film-formation methods usable are ones such as a vapor-deposition method, a CVD method and a sputtering method.

The lithium alloy is constituted of lithium and metals alloyable with lithium. The lithium alloy is constituted of a binary, ternary, or more multi-metal alloy of metals such as Al, Si, Pb, Sn, In, Bi, Ag, Ba, Ca, Hg, Pd, Pt, Te, Zn and La, with lithium. Metallic lithium and lithium alloys are especially preferable in an amorphous state. This is because the amorphous structure hardly causes deteriorations caused by non-uniformity such as crystal grain boundaries and defects.

Metallic lithium and lithium alloys are suitably formed by a system including a melt cooling system, a liquid quenching system, an atomizing system, a vacuum vapor-deposition system, a sputtering system, a plasma CVD system, an optical CVD system, a thermal CVD system and a sol-gel system.

In the lithium ion secondary battery according to the exemplary embodiment, examples of a positive electrode active substance include lithium-containing composite oxides such as $LiCoO_2$, $LiNiO_2$ and $LiMn_2O_4$. A transition metal part of the lithium-containing composite oxides may be replaced by another element.

A lithium-containing composite oxide having a plateau of 4.5 V or higher vs. a counter electrode potential of metallic lithium may be used. The lithium-containing composite oxide is exemplified by a spinel-type lithium-manganese composite oxide, an olivine-type lithium-containing composite oxide and an inverse-spinel-type lithium-containing composite oxide. An example of the lithium-containing composite oxide include a compound represented by $Li_a(M_xMn_{2-x})O_4$ (here, $0<x<2$; $0<a<1.2$; and M is at least one selected from the group consisting of Ni, Co, Fe, Cr and Cu).

The nonaqueous electrolyte solution according to the exemplary embodiment may be gelated with a gelling component. That is, the nonaqueous electrolyte solution according to the exemplary embodiment includes gelatinous materials. Examples of the gelling component include polymer components. Examples of the polymer component include monomers, oligomers and copolymerized oligomers having two or more thermally polymerizable polymerization groups in one molecule thereof. Examples of the polymer component include compounds to form acrylic polymers including difunctional acrylates such as ethylene glycol diacrylate, diethylene glycol diacrylate, triethylene glycol diacrylate, tetraethylene glycol diacrylate, propylene diacrylate, dipropylene diacrylate, tripropyrene diacrylate, 1,3-butanediol diacrylate, 1,4-butanediol diacrylate and 1,6-hexanediol diacrylate, trifunctional acrylates such as trimethylolpropane triacrylate and pentaerythritol triacrylate, tetrafunctional acrylates such as ditrimethylolpropane tetraacrylate and pentaerythritol tetraacrylate, and methacrylates corresponding thereto. Additional examples of the polymer component include monomers such as urethane acrylates and urethane methacrylate, copolymerized oligomers thereof and copolymerized oligomers with acrylonitrile.

Gelling components also usable are polymers having a gelling power, such as polyvinylidene fluoride, polyethylene oxide and polyacrylonitrile.

Gelling components are not limited to the above-mentioned monomers, oligomers and polymers, and can be used without any especial problem as long as being capable of gelating a nonaqueous electrolyte solution. The gelling component may be used singly or concurrently in tow or more.

As required, benzoins, peroxides and the like can be used as a thermopolymerization initiator, but the thermopolymerization initiator is not limited to these.

The nonaqueous electrolyte solution according to the exemplary embodiment can reduce the amount of gases generated in the initial charge, which is preferable also from the viewpoint of the safety and the production process. The reason is presumed to be that since the coexistence of an oxo-acid ester derivative of phosphorus and a disulfonate ester in a nonaqueous electrolyte solution can form an SEI having a part of the oxo-acid ester derivative of phosphorus incorporated therein by a reaction mechanism different from that of the SEI formation in a nonaqueous electrolyte solution containing only a disulfonate ester, the generation amount of gases is reduced. Judging from that on an SEI formed in such a way, the reduction of an oxo-acid ester derivative of phosphorus present in a nonaqueous electrolyte solution can be suppressed, it is presumed that the SEI by disulfonate ester having the oxo-acid ester derivative of phosphorus incorporated therein is firmly formed, and the suppression effect of the reductive decomposition of the oxo-acid ester derivative of phosphorus and components in the nonaqueous electrolyte solution may possibly be enhanced. It is conceivable that the effect can achieve the suppression of a resistance rise and the suppression of gas generation in the long-term cycle, leading to good life characteristics. Further since the oxo-acid ester derivative of phosphorus can be suppressed in the reductive decomposition over a long period, high safety can be attained over a long period.

The battery constitution of the lithium ion secondary battery according to the present embodiment is not especially limited, but includes, for example, laminated types and wound types. An armor body is not especially limited, but includes, for example, aluminum laminate films and metal cans. The battery capacity is not limited.

With respect to the device according to the exemplary embodiment, in the exemplary embodiment and Examples, mainly lithium ion secondary batteries have been and will be described. However, the present invention is not especially limited thereto, and the nonaqueous electrolyte solution according to the exemplary embodiment can be applied also to capacitors.

EXAMPLES

Hereinafter, the present invention will be described in detail by way of Examples and by reference to drawings, but the present invention is not limited to the Examples.

FIG. 1 is a schematic diagram illustrating a constitution of a positive electrode of a lithium ion secondary battery; and FIG. 1(a) is a plan diagram of the positive electrode, and FIG. 1(b) is a side diagram of the positive electrode.

Figure 2:
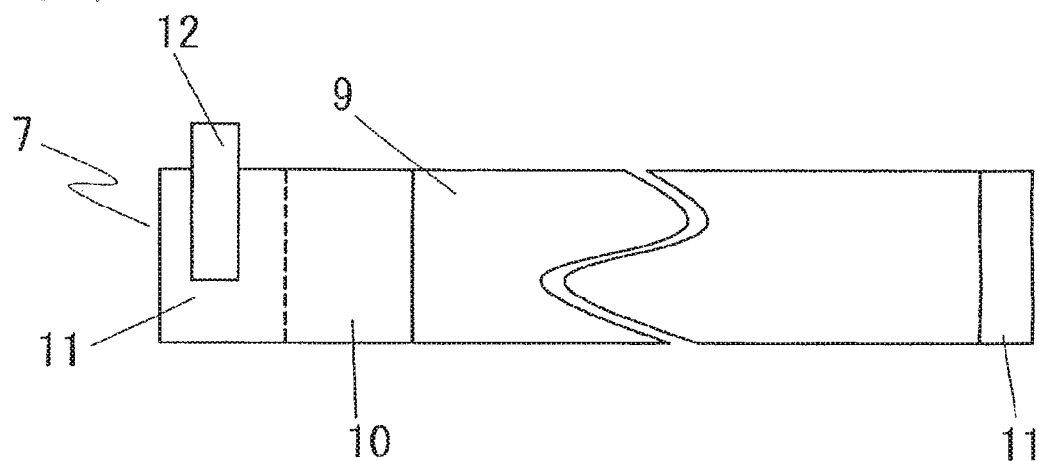
FIG. 2 is a schematic diagram illustrating a constitution of a negative electrode of a lithium ion secondary battery.
Figure 2:
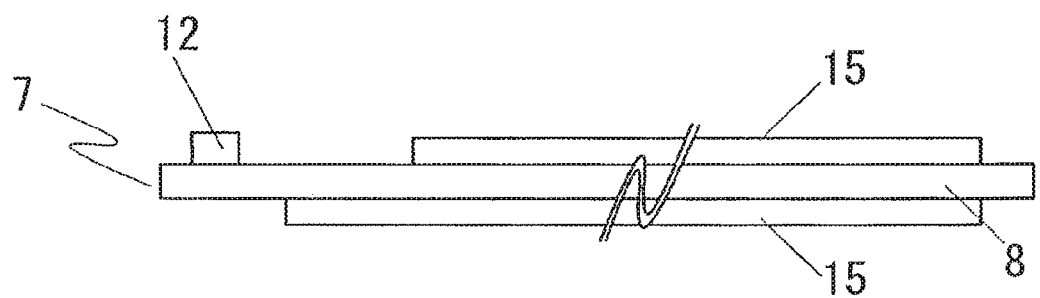

FIG. 2 is a schematic diagram illustrating a constitution of a negative electrode of a lithium ion secondary battery; and FIG. 2(a) is a plan diagram of the negative electrode, and FIG. 2(b) is a side diagram of the negative electrode.

Figure 3:
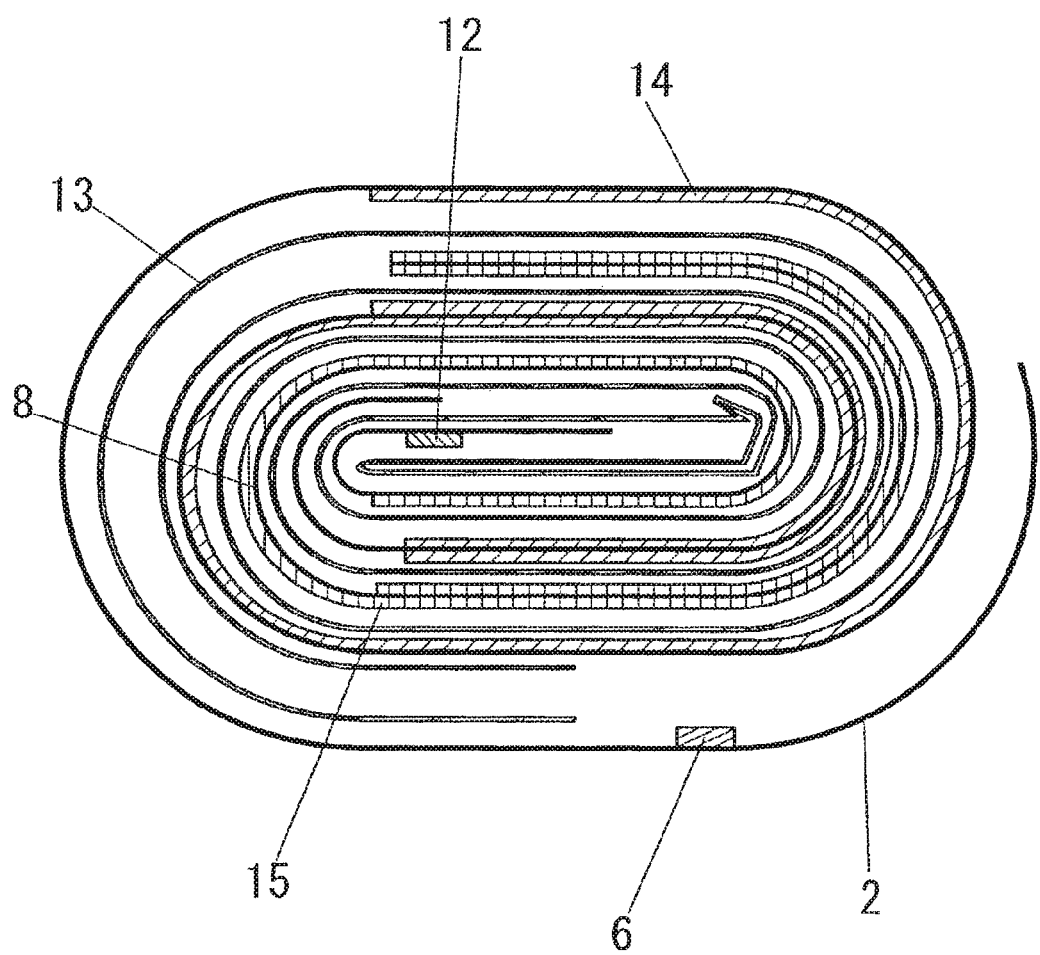
FIG. 3 is a diagram illustrating a constitution of a battery element after being wound of a lithium ion secondary battery.

FIG. 3 is a diagram illustrating a constitution of a battery element after being wound of a lithium ion secondary battery.

Example 1

First, fabrication of a positive electrode 1 will be described by reference to FIG. 1. 85% by mass of $LiMn_2O_4$ as a positive electrode active substance, 7% by mass of an acetylene black as a conductive auxiliary material and 8% by mass of a polyvinylidene fluoride as a binder were mixed; and N-methylpyrrolidone was added to the mixture, and further mixed to thereby prepare a positive electrode slurry. The positive electrode slurry was applied on both surfaces of an Al foil 2 having a thickness of 20 μm to become a current collector by a doctor blade method so that the thickness after a roll pressing process became 160 μm, dried at 120° C. for 5 min, and subjected to the roll pressing process to thereby form positive electrode active substance layers 14. Positive electrode active substance-unapplied portions 5, on which no positive electrode active substance was applied, were provided on either surface of both end parts of the foil. A positive electrode conductive tab 6 was provided by welding on one of the positive electrode active substance-unapplied portions 5. A positive electrode active substance-one surface-applied portion 4, which was a portion of one surface having the positive electrode active substance applied only on the one surface, was provided adjacent to the positive electrode active substance-unapplied portion 5 provided with the positive electrode conductive tab 6. Here, reference numeral 3 was a positive electrode active substance-both surface-applied portion. A positive electrode 1 was thus fabricated by the above method.

Then, fabrication of a negative electrode 7 will be described by reference to FIG. 2. 90% by mass of a graphite as a negative electrode active substance, 1% by mass of an acetylene black as a conductive auxiliary material and 9% by mass of a polyvinylidene fluoride as a binder were mixed; and N-methylpyrrolidone was added to the mixture, and further mixed to thereby prepare a negative electrode slurry. The negative electrode slurry was applied on both surfaces of a Cu foil 8 having a thickness of 10 μm to become a current collector by a doctor blade method so that the thickness after a roll pressing process became 120 μm, dried at 120° C. for 5 min, and subjected to the roll pressing process to thereby form negative electrode active substance layers 15. Negative electrode active substance-unapplied portions 11, on which no negative electrode active substance was applied, were provided on either surface of both end parts of the foil. A negative electrode conductive tab 12 was provided by welding on one of the negative electrode active substance-unapplied portions 11. A negative electrode active substance-one surface-applied portion 10, which was a portion of one surface having the negative electrode active substance applied only on the one surface, was provided adjacent to the negative electrode active substance-unapplied portion 11 provided with the negative electrode conductive tab 12. Here, reference numeral 9 was a negative electrode active substance-both surface-applied portion. A negative electrode 7 was thus fabricated by the above method.

Fabrication of a battery element will be described by reference to FIG. 3. A fused and cut portion of two sheets of a separator 13 composed of a polypropylene microporous membrane having a membrane thickness of 25 μm and a porosity of 55% and being subjected to a hydrophilicizing treatment was fixed and wound to a winding core of a winding apparatus, and front ends of the positive electrode and the negative electrode were introduced. The side of the positive electrode opposite to the connection portion of the positive electrode conductive tab 6 was made to be the front end side of the positive electrode; and the side of the connection portion of the negative electrode conductive tab 12 was made to be the front end side of the negative electrode. The negative electrode was disposed between the two sheets of the separator 13, and the positive electrode was disposed on the upper surface of the separator 13; and the both were wound by rotating the winding core to thereby form a battery element (hereinafter, referred to as a jelly roll (J/R)).

The J/R was accommodated in an embossed laminate armor body; the positive electrode conductive tab 6 and the negative electrode conductive tab 12 were led out; and one side of the laminate armor body was folded back, and thermally fused with a portion for solution injection being left unfused.

A nonaqueous electrolyte solution was prepared which contained 1.2 mol/L of $LiPF_6$ as a supporting salt, 5% by mass of tri(2,2,2-trifluoroethyl) phosphate as an oxo-acid ester derivative of phosphorus, and 2% by mass of the compound No. 2 in Table 1 as a disulfonate ester as an additive. An aprotic solvent of ethylene carbonate (EC)/diethyl carbonate (DEC)=30/70 (volume ratio) was used.

Then, the nonaqueous electrolyte solution was injected through the laminate solution injection portion, and impregnated under vacuum. Then, the solution injection portion was thermally fused to thereby obtain a lithium ion secondary battery.

A discharge capacity acquired when the obtained battery was CC-CV charged (constant current-constant voltage charge, charge conditions: a CC current of 0.2 C, a CV time of 1.5 hours, and a temperature of 20° C.) to a battery voltage of 4.2 V, and thereafter discharged at 0.2 C to a battery voltage of 3.0 V was defined as an initial capacity. The proportion of the acquired initial capacity to a design capacity was defined as an initial capacity (%).

A cycle test of the obtained battery was carried out by carrying out CC-CV charge at an upper-limit voltage of 4.2 V, a current of 1 C and a CV time of 1.5 hours, and CC discharge at a lower-limit voltage of 3.0 V and a current of 1 C, and both at 45° C. The capacity maintenance rate was defined as a proportion of a discharge capacity at the 1,000th cycle to a discharge capacity at the first cycle. The capacity maintenance rate is shown in Table 3.

A combustion test was carried out by placing a battery after the cycle test 10 cm above the tip end of a flame of a gas burner. Then, the flame retardancy was determined as follows from a state of a nonaqueous electrolyte solution burning. A case where the nonaqueous electrolyte solution was not ignited was indicated as ⊙; a case where even if ignition was caused, the fire extinguished 2 to 3 sec after the ignition, as ○; a case where even if ignition was caused, the fire extinguished within 10 sec, as Δ; and a case where the fire did not extinguished within 10 sec and burning continued, as x.

Example 2

In Example 2, a battery was fabricated and evaluated as in the case of Example 1, except for preparing a nonaqueous electrolyte solution by mixing 10% by mass of tri(2,2,2-trifluoroethyl) phosphate (hereinafter, referred to also as PTTFE).

Example 3

In Example 3, a battery was fabricated and evaluated as in the case of Example 1, except for preparing a nonaqueous electrolyte solution by mixing 20% by mass of PTTFE.

Example 4

In Example 4, a battery was fabricated and evaluated as in the case of Example 1, except for preparing a nonaqueous electrolyte solution by mixing 40% by mass of PTTFE.

Example 5

In Example 5, a battery was fabricated and evaluated as in the case of Example 3, except for preparing a nonaqueous electrolyte solution by altering PTTFE to di(trifluoroethyl) fluorophosphonate.

Example 6

In Example 6, a battery was fabricated and evaluated as in the case of Example 3, except for preparing a nonaqueous electrolyte solution by altering PTTFE to trifluoroethyl difluorophosphinate.

Example 7

In Example 7, a battery was fabricated and evaluated as in the case of Example 3, except for preparing a nonaqueous electrolyte solution by using the compound No. 101 in Table 2 in place of the compound No. 2 as an additive.

Example 8

In Example 8, a battery was fabricated and evaluated as in the case of Example 3, except for preparing a nonaqueous electrolyte solution by mixing 3% by mass of fluoroethylene carbonate (FEC) in addition to the compound No. 2 as an additive.

Example 9

In Example 9, a battery was fabricated and evaluated as in the case of Example 8, except for preparing a nonaqueous electrolyte solution by using the compound No. 101 in Table 2 in place of the compound No. 2 as an additive.

Example 10

In Example 10, a battery was fabricated and evaluated as in the case of Example 8, except for preparing a nonaqueous electrolyte solution by altering the amount of PTTFE to 60% by mass.

Comparative Example 1

In Comparative Example 1, a battery was fabricated and evaluated as in the case of Example 3, except for preparing a nonaqueous electrolyte solution by mixing 3% by mass of 1,3-propane sultone (PS) in place of the compound No. 2 as an additive.

Comparative Example 2

In Comparative Example 2, a battery was fabricated and evaluated as in the case of Example 3, except for preparing a nonaqueous electrolyte solution by mixing 3% by mass of vinylene carbonate (VC) in place of the compound No. 2 as an additive.

Comparative Example 3

In Comparative Example 3, a battery was fabricated and evaluated as in the case of Example 3, except for preparing a nonaqueous electrolyte solution by mixing 3% by mass of fluoroethylene carbonate in place of the compound No. 2 as an additive.

Comparative Example 4

In Comparative Example 4, a battery was fabricated and evaluated as in the case of Example 3, except for preparing a nonaqueous electrolyte solution by mixing 3% by mass of vinylene carbonate and 3% by mass of fluoroethylene carbonate in place of the compound No. 2 as additives.

Comparative Example 5

In Comparative Example 5, a battery was fabricated and evaluated as in the case of Example 10, except for preparing a nonaqueous electrolyte solution by mixing 3% by mass of vinylene carbonate in place of the compound No. 2 as an additive.

The results of the initial capacity, the capacity maintenance rate and the flame retardancy in Examples 1 to 10 and Comparative Examples 1 to 5 are shown in Table 3.

TABLE 3

| | Negative Electrode Active Substance/ Electrolyte | Oxo-Acid Ester Derivative of Phosphorus | Addition Amount (mass %) | Additive | Initial Capacity (%) | Capacity Maintenance Rate (%) | Flame Retardancy |
|---|---|---|---|---|---|---|---|
| Example 1 | graphite/ liquid | tri(trifluoroethyl) phosphate | 5 | No. 2 | 93 | 82 | ○ |

TABLE 3-continued

| | Negative Electrode Active Substance/ Electrolyte | Oxo-Acid Ester Derivative of Phosphorus | Addition Amount (mass %) | Additive | Initial Capacity (%) | Capacity Maintenance Rate (%) | Flame Retardancy |
|---|---|---|---|---|---|---|---|
| Example 2 | graphite/liquid | tri(trifluoroethyl) phosphate | 10 | No. 2 | 91 | 75 | ○ |
| Example 3 | graphite/liquid | tri(trifluoroethyl) phosphate | 20 | No. 2 | 91 | 75 | ⊙ |
| Example 4 | graphite/liquid | tri(trifluoroethyl) phosphate | 40 | No. 2 | 87 | 67 | ⊙ |
| Example 5 | graphite/liquid | Di(trifluoroethyl) fluorophosphonate | 20 | No. 2 | 93 | 81 | ⊙ |
| Example 6 | graphite/liquid | Trifluoroethyl difluorophosphinate | 20 | No. 2 | 93 | 82 | ⊙ |
| Example 7 | graphite/liquid | tri(trifluoroethyl) phosphate | 20 | No. 101 | 90 | 74 | ⊙ |
| Example 8 | graphite/liquid | tri(trifluoroethyl) phosphate | 20 | No. 2 + FEC | 85 | 84 | ⊙ |
| Example 9 | graphite/liquid | tri(trifluoroethyl) phosphate | 20 | No. 101 + FEC | 88 | 85 | ⊙ |
| Example 10 | graphite/liquid | tri(trifluoroethyl) phosphate | 60 | No. 2 + FEC | 76 | 75 | ⊙ |
| Comparative Example 1 | graphite/liquid | tri(trifluoroethyl) phosphate | 20 | PS | 93 | 54 | Δ |
| Comparative Example 2 | graphite/liquid | tri(trifluoroethyl) phosphate | 20 | VC | 91 | 56 | Δ |
| Comparative Example 3 | graphite/liquid | tri(trifluoroethyl) phosphate | 20 | FEC | 89 | 36 | X |
| Comparative Example 4 | graphite/liquid | tri(trifluoroethyl) phosphate | 20 | VC + FEC | 81 | 59 | Δ |
| Comparative Example 5 | graphite/liquid | tri(trifluoroethyl) phosphate | 60 | VC + FEC | 53 | 11 | ○ |

No. 2 in the column of an additive in Table 3 indicates the compound No. 2 in Table 1; No. 101, the compound No. 101 in Table 2; FEC, fluoroethylene carbonate; PS, 1,3-propane sultone; and VC, vinylene carbonate.

As shown in Examples 1 to 4, if the content of an oxo-acid ester derivative of phosphorus was increased, the flame retardancy of a nonaqueous electrolyte solution became very good, and no ignition occurred, and even if ignition occurred, the fire extinguished 2 to 3 sec after the ignition.

Comparing Examples 3 and 5 to 7 with Comparative Examples 1 and 2, which all contained the same amount of a phosphate ester, the capacity maintenance rate was good and the flame retardancy was very good for Examples 3 and 5 to 7, in which a disulfonate ester was added. By contrast, the capacity maintenance rate after the cycle decreased, and the flame retardancy was low in Comparative Examples 1 and 2.

Further for Comparative Example 4, in which a fluoroethylene carbonate was added, the capacity maintenance rate and the flame retardancy were slightly improved, but the flame retardancy could not be said to be sufficient. By contrast, for Examples 8 and 9, the capacity maintenance rate and the flame retardancy were both good. Also from the comparison of Example 10 with Comparative Example 5, in both of which the content of tri(trifluoroethyl) phosphate used as an electrolyte solution solvent was made large, Example 10 was better in both the capacity maintenance rate and the flame retardancy due to the effect of a disulfonate ester.

From the above, the SEI formation by a disulfonate ester could suppress the reductive decomposition of an oxo-acid ester derivative of phosphorus over a long period, could provide a good capacity maintenance rate, and could further provide a high flame retardancy. Further, incorporation of a halogen-containing cyclic carbonate ester in addition to a disulfonate ester in an electrolyte solution formed a good SEI, and consequently could further suppress the reductive decomposition of the oxo-acid ester derivative of phosphorus, further could reduce the gas generation amount in the cycle, and then could provide a good capacity maintenance rate.

Example 11

In Example 11, an example will be described in which a nonaqueous electrolyte solution was gelated with a gelling component to be thereby made into a gel electrolyte. A battery was fabricated and evaluated as in Example 1, except for making a secondary battery having a gel electrolyte by using the following pre-gel solution.

The pre-gel solution was prepared by mixing 1.2 mol/L of $LiPF_6$ as a supporting salt, EC/DEC=30/70 (volume ratio) as aprotic solvents, 20% by mass of tri(trifluoroethyl) phosphate as an oxo-acid ester derivative of phosphorus, 2% by mass of the compound No. 2 in Table 1 as a disulfonate ester as an additive, 3.8% by mass of triethylene glycol diacrylate as a gelling component, 1% by mass of trimethylolpropane triacrylate as a gelling component, and 0.5% by mass of t-butyl peroxypivalate as a polymerization initiator.

Then, the pre-gel solution was injected through the solution injection portion, and impregnated under vacuum. Then, the solution injection portion was thermally fused. Then, the pre-gel solution was polymerized at 80° C. for 2 hours to be gelated to thereby obtain a lithium ion secondary battery (lithium polymer battery) having a gelatinous nonaqueous electrolyte solution.

Example 12

In Example 12, a battery was fabricated and evaluated as in the case of Example 11, except for preparing a pre-gel solution by mixing 3% by mass of fluoroethylene carbonate in addition to the compound No. 2 as an additive.

Comparative Example 6

In Comparative Example 6, a battery was fabricated and evaluated as in the case of Example 12, except for preparing a pre-gel solution by mixing 3% by mass of vinylene carbonate in place of the compound No. 2.

The results of the initial capacity, the capacity maintenance rate and the flame retardancy in Examples 11 and 12 and Comparative Example 6 are shown in Table 4.

TABLE 4

|  | Negative Electrode Active Substance/ Electrolyte | Oxo-Acid Ester Derivative of Phosphorus | Addition Amount (mass %) | Additive | Initial Capacity (%) | Capacity Maintenance Rate (%) | Flame Retardancy |
|---|---|---|---|---|---|---|---|
| Example 11 | graphite/ polymer | tri(trifluoroethyl) phosphate | 20 | No. 2 | 73 | 56 | ○ |
| Example 12 | graphite/ polymer | tri(trifluoroethyl) phosphate | 20 | No. 2 + FEC | 71 | 63 | ○ |
| Comparative Example 6 | graphite/ polymer | tri(trifluoroethyl) phosphate | 20 | VC + FEC | 65 | 40 | X |

No. 2 in the column of an additive in Table 4 indicates the compound No. 2 in Table 1; FEC, fluoroethylene carbonate; and VC, vinylene carbonate.

From Table 4, even in the case of a gelatinous nonaqueous electrolyte solution, the SEI formation by a disulfonate ester could suppress the reductive decomposition of an oxo-acid ester derivative of phosphorus over a long period, could provide a good capacity maintenance rate, and could further provide a high flame retardancy.

Example 13

In Example 13, an example will be described in which a negative electrode active substance containing a silicon-based material was used. A battery was fabricated and evaluated as in Example 3, except for making a secondary battery having a negative electrode having a negative electrode active substance as described below.

First, 90% by mass of silicon as a negative electrode active substance, 1% by mass of an acetylene black as a conductive auxiliary material and 9% by mass of a polyimide as a binder were mixed; and N-methylpyrrolidone was added to the mixture, and further mixed to thereby prepare a negative electrode slurry. The negative electrode slurry was applied on both surfaces of a Cu foil having a thickness of 10 μm to become a current collector by a doctor blade method so that the thickness after a roll pressing process became 80 μm, dried at 120° C. for 5 min, subjected to the roll pressing process, and further additionally dried at 300° C. for 10 min to thereby form negative electrode active substance layers 15.

Example 14

In Example 14, a battery was fabricated and evaluated as in the case of Example 13, except for preparing a nonaqueous electrolyte solution by mixing 3% by mass of fluoroethylene carbonate in addition to the compound No. 2 as an additive.

Comparative Example 7

In Comparative Example 7, a battery was fabricated and evaluated as in the case of Example 14, except for preparing a nonaqueous electrolyte solution by mixing 3% by mass of vinylene carbonate in place of the compound No. 2 as an additive.

Cycle tests of Examples 13 and 14 and Comparative Example 7 were carried out by carrying out CC-CV charge at an upper-limit voltage of 4.2 V, a current of 1 C and a CV time of 1.5 hours, and CC discharge at a lower-limit voltage of 3.0 V and a current of 1 C, and both at 45° C. The capacity maintenance rate was defined as a proportion of a discharge capacity at the 200th cycle to a discharge capacity at the first cycle.

The results of the initial capacity, the capacity maintenance rate and the flame retardancy in Examples 13 and 14 and Comparative Example 7 are shown in Table 5.

TABLE 5

|  | Negative Electrode Active Substance/ Electrolyte | Oxo-Acid Ester Derivative of Phosphorus | Addition Amount (mass %) | Additive | Initial Capacity (%) | Capacity Maintenance Rate (%) | Flame Retardancy |
|---|---|---|---|---|---|---|---|
| Example 13 | silicon/ liquid | tri(trifluoroethyl) phosphate | 20 | No. 2 | 76 | 68 | ○ |
| Example 14 | silicon/ liquid | tri(trifluoroethyl) phosphate | 20 | No. 2 + FEC | 69 | 72 | ○ |
| Comparative Example 7 | silicon/ liquid | tri(trifluoroethyl) phosphate | 20 | VEC + FEC | 68 | 47 | Δ |

No. 2 in the column of an additive in Table 5 indicates the compound No. 2 in Table 1; FEC, fluoroethylene carbonate; and VC, vinylene carbonate.

From Table 5, even when a silicon material was used in place of graphite as a negative electrode active substance, the SEI formation by a disulfonate ester could suppress the reductive decomposition of an oxo-acid ester derivative of phosphorus, could provide a good capacity maintenance rate, and could further provide a high flame retardancy.

It can be confirmed from the above that the exemplary embodiment could provide a nonaqueous electrolyte solution having a high flame retardancy over a long period, and having a good capacity maintenance rate.

The present application claims the priority to Japanese Patent Application No. 2010-027056, filed on Feb. 10, 2010, the disclosure of which is all incorporated herein.

Hitherto, the present invention has been described by reference to the exemplary embodiment and Examples, but the present invention is not limited to the exemplary embodiment and the Examples. In the constitution and the detail of the present invention, various changes and modifications understandable to those skilled in the art may be made within the scope of the present invention.

REFERENCE SIGNS LIST

1 POSITIVE ELECTRODE
2 Al FOIL
3 POSITIVE ELECTRODE ACTIVE SUBSTANCE-BOTH SURFACE-APPLIED PORTION
4 POSITIVE ELECTRODE ACTIVE SUBSTANCE-ONE SURFACE-APPLIED PORTION
5 POSITIVE ELECTRODE ACTIVE SUBSTANCE-UNAPPLIED PORTION
6 POSITIVE ELECTRODE CONDUCTIVE TAB
7 NEGATIVE ELECTRODE
8 Cu FOIL
9 NEGATIVE ELECTRODE ACTIVE SUBSTANCE-BOTH SURFACE-APPLIED PORTION
10 NEGATIVE ELECTRODE ACTIVE SUBSTANCE-ONE SURFACE-APPLIED PORTION
11 NEGATIVE ELECTRODE ACTIVE SUBSTANCE-UNAPPLIED PORTION
12 NEGATIVE ELECTRODE CONDUCTIVE TAB
13 SEPARATOR
14 POSITIVE ELECTRODE ACTIVE SUBSTANCE LAYER
15 NEGATIVE ELECTRODE ACTIVE SUBSTANCE LAYER

The invention claimed is:

1. A nonaqueous electrolyte solution, comprising:
a lithium salt;
at least one oxo-acid ester derivative of phosphorus selected from halogen-substituted phosphate esters represented by formula (1);
at least one linear disulfonate ester represented by the formula (5); and
0.5% by mass or more and 20% by mass or less of a cyclic carbonate ester containing a halogen:

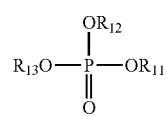

(1)

in the formula (1), $R_{11}$, $R_{12}$ and $R_{13}$ each independently represent any group selected from an alkyl group, an aryl group, an alkenyl group, a cyano group, a phenyl group, an amino group, a nitro group, an alkoxy group and a cycloalkyl group, and a halogen-substituted group thereof; where any two or all of $R_{11}$, $R_{12}$ and $R_{13}$ may be bonded to form a cyclic structure, and where at least one of $R_{11}$, $R_{12}$ or $R_{13}$ is a halogen-substituted group;

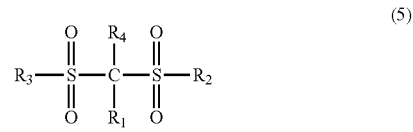

(5)

in the formula (5), $R_1$ and $R_4$ each independently represent an atom or a group selected from a hydrogen atom, a substituted or unsubstituted alkyl group having 1 to 5 carbon atoms, a substituted or unsubstituted alkoxy group having 1 to 5 carbon atoms, a substituted or unsubstituted fluoroalkyl group having 1 to 5 carbon atoms, a polyfluoroalkyl group having 1 to 5 carbon atoms, $-SO_2X_{11}$, where $X_{11}$ is a substituted or unsubstituted alkyl group having 1 to 5 carbon atoms, $-SY_{11}$, where $Y_{11}$ is a substituted or unsubstituted alkyl group having 1 to 5 carbon atoms, $-COZ$, where Z is a hydrogen atom or a substituted or unsubstituted alkyl group having 1 to 5 carbon atoms, and a halogen atom; and $R_2$ and $R_3$ each independently represent an atom or a group selected from a substituted or unsubstituted alkyl group having 1 to 5 carbon atoms, a substituted or unsubstituted alkoxy group having 1 to 5 carbon atoms, a substituted or unsubstituted phenoxy group, a substituted or unsubstituted fluoroalkyl group having 1 to 5 carbon atoms, a polyfluoroalkyl group having 1 to 5 carbon atoms, a substituted or unsubstituted fluoroalkoxy group having 1 to 5 carbon atoms, a polyfluoroalkoxy group having 1 to 5 carbon atoms, a hydroxyl group, a halogen atom, $-NX_{12}X_{13}$, where $X_{12}$ and $X_{13}$ are each independently a hydrogen atom or a substituted or unsubstituted alkyl group having 1 to 5 carbon atoms, and $-NY_{12}CONY_{13}Y_{14}$, where $Y_{12}$ to $Y_{14}$ are each independently a hydrogen atom or a substituted or unsubstituted alkyl group having 1 to 5 carbon atoms.

2. The nonaqueous electrolyte solution according to claim 1, comprising 5% by mass or more and 60% by mass or less of the oxo-acid ester derivative of phosphorus.

3. The nonaqueous electrolyte solution according to claim 1, comprising 0.05% by mass or more and 10% by mass or less of the disulfonate ester.

4. A lithium ion secondary battery, comprising a nonaqueous electrolyte solution according to claim 1.

5. A capacitor, comprising a nonaqueous electrolyte solution according to claim 1.

* * * * *

UNITED STATES PATENT AND TRADEMARK OFFICE
CERTIFICATE OF CORRECTION

PATENT NO. : 9,847,180 B2
APPLICATION NO. : 14/978503
DATED : December 19, 2017
INVENTOR(S) : Shinako Kaneko et al.

It is certified that error appears in the above-identified patent and that said Letters Patent is hereby corrected as shown below:

In the Specification

Column 4, Summary of Invention, Line 60; After "to", insert --5--

Column 8, Description of Embodiments, Line 20; After "to", insert --5--

Signed and Sealed this
Eighteenth Day of June, 2019

Andrei Iancu
*Director of the United States Patent and Trademark Office*